Dec. 2, 1969   W. J. M. CAMPBELL   3,481,623
VEHICLE WHEEL SUSPENSION MEANS
Filed Aug. 23, 1967
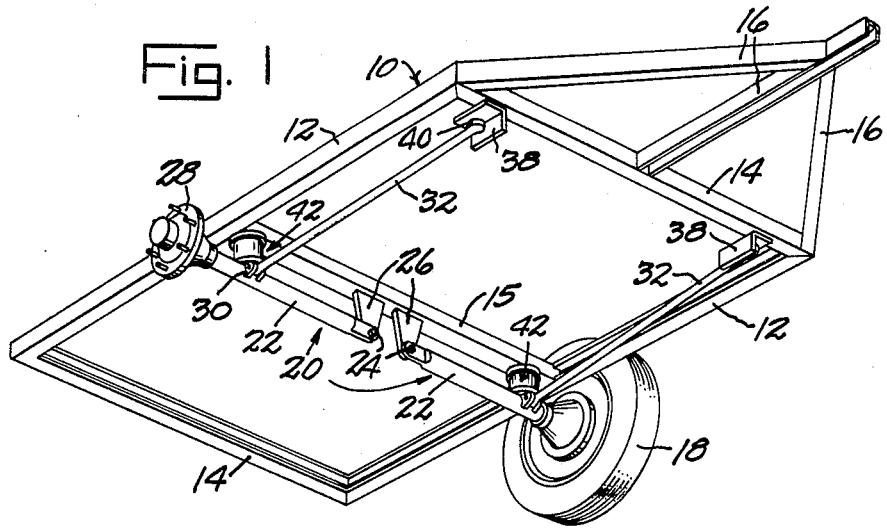
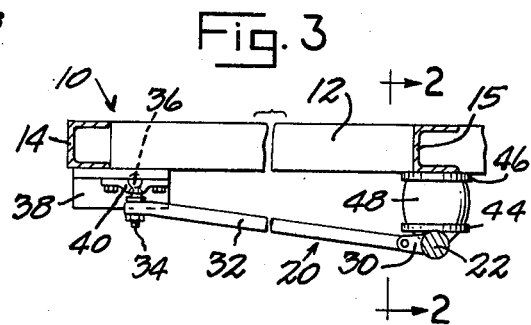
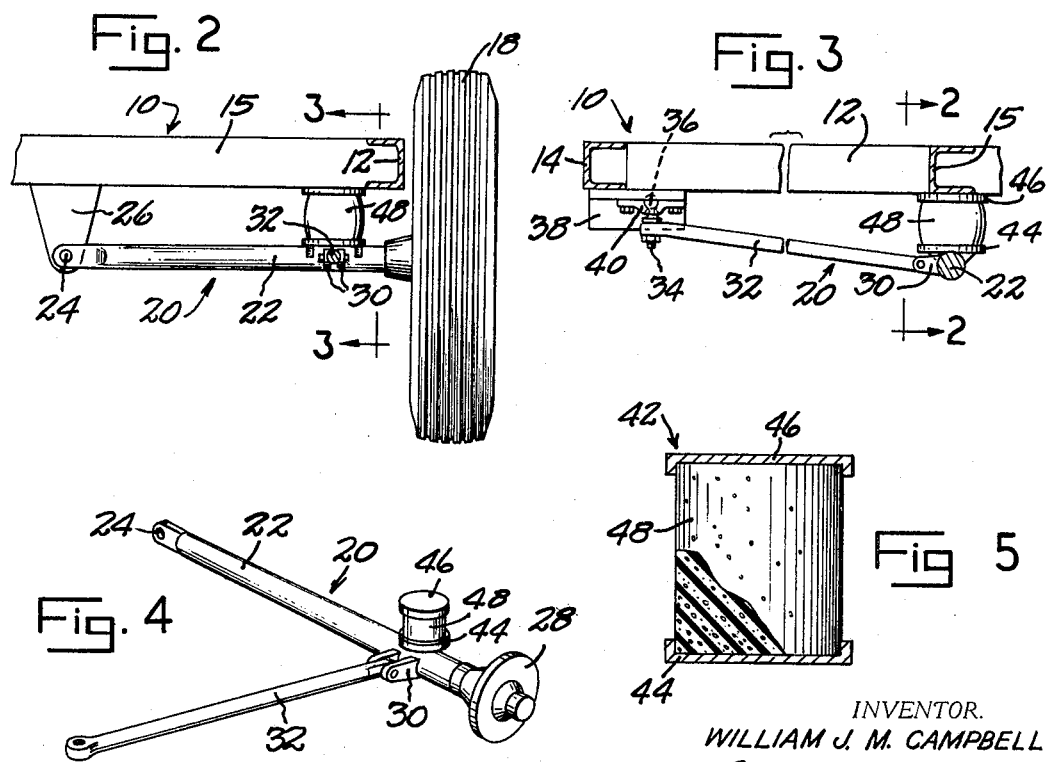
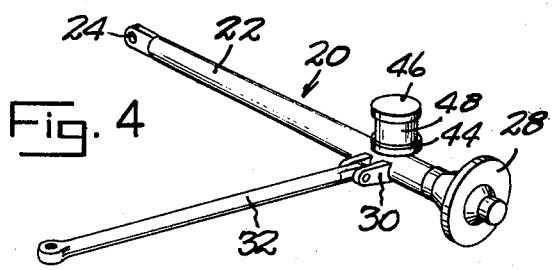
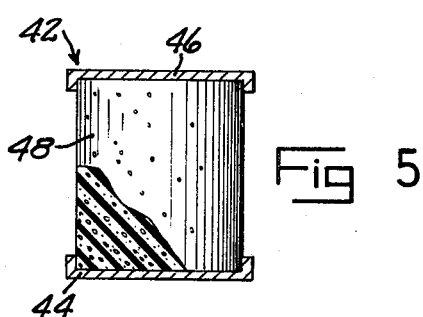
INVENTOR.
WILLIAM J. M. CAMPBELL
BY
ATTORNEY

United States Patent Office 3,481,623
Patented Dec. 2, 1969

3,481,623
VEHICLE WHEEL SUSPENSION MEANS
William J. M. Campbell, Elkhart, Ind., assignor to Elkhart Bridge and Iron Company, Inc., a corporation of Indiana
Filed Aug. 23, 1967, Ser. No. 662,751
Int. Cl. B62d 59/00
U.S. Cl. 280—124                                      6 Claims

ABSTRACT OF THE DISCLOSURE

A vehicle wheel suspension means having a transverse axle pivoted at its inner end to a vehicle chassis and pivotally connected to a forwardly extending radius rod pivoted to the chassis, and having compressible resilient means secured to the chassis and to the axle spaced from the axle pivot, said resilient means including a body of foam material compounded to damp the rebound ratio thereof and having a protective coating thereon.

---

This invention relates to improvements in vehicle wheel suspension means. More particularly it relates to wheel suspension means for light-weight load carrying vehicles such as boat trailers, travel trailers, campers and utility trailers.

Various types of wheel suspension means for boat trailers and other load carrying small vehicles, particularly of the trailer type, have been developed heretofore. Such prior suspension means commonly utilize springs, such as leaf springs or coil springs, such as shown in U.S. Patents 2,689,015 and 3,179,439, and have been subject to various disadvantages and limitations such as a requirement for the use of separate snubbing or shock absorbing means, or for the use of parts and components and the assembly thereof. Various efforts have also been made to utilize other cushioning means, such as devices in which cushioning members are positioned in shear relation between supported and supporting members, as shown in U.S. Patent 2,836,413, or devices as shown in U.S. Patent 3,012,795 in which inflated members serve as cushioning means. Some devices have been considered, such as shown in U.S. Patents 3,081,993 and 3,180,653, in which elastomeric members placed in compression but these frequently require association of expensive or complicated components therewith or are subject to other problems or limitations, such as damping of both compression and rebound.

It is the primary object of this invention to provide wheel suspension means which is effective for its intended purpose, is simple and inexpensive in construction, is highly effective for its intended purpose, and overcomes the disadvantages or limitations of prior devices.

A further object is to provide a device of this character wherein a body of foam type resilient material which is characterized by a slow recovery or rebound serves both to sustain compression under load and impact and to absorb shock and control rebound, so as to provide good travel characteristics in a trailing type load carrying vehicle.

A further object is to provide a device of this character wherein each wheel of a vehicle is connected thereto by a pair of pivotally connected substantially perpendicularly extending members pivoted to the frame and connected adjacent to the connection of the perpendicularly related parts thereof by a compressible resilient member having slow rebound characteristics.

Other objects will be apparent from the following specifications.

In the drawing:

FIG. 1 is a bottom perspective view of a trailer chassis and undercarriage illustrating my new suspension means with one wheel thereof removed.

FIG. 2 is a vertical transverse sectional view taken on line 2—2 of FIG. 3.

FIG. 3 is a fragmentary vertical longitudinal sectional view taken on line 3—3 of FIG. 2.

FIG. 4 is a perspective view of the wheel suspension unit per se.

FIG. 5 is a view in elevation with parts shown in section, illustrating the construction of the compressible element or subassembly utilized in the device.

Referring to the drawing which illustrates one embodiment of the invention, the numeral 10 designates the chassis of a vehicle, such as a boat trailer, a travel trailer, a camper or a utility trailer. The chassis is of any suitable construction and preferably includes rigidly interconnected longitudinal chassis or frame members 12 and transverse chassis members 14. One of the rigid transverse chassis members 15 is positioned intermediate the length of the chassis. The chassis members are welded, bolted or otherwise suitably interconnected to form a rigid unit and preferably have connected thereto members 16 defining a forwardly projecting A-frame at the forward end of the chassis to which may be mounted a hitch member (not shown).

The vehicle chassis or frame is supported upon wheels 18, each of which is connected by an undercarriage unit 20 to the chassis to be positioned intermediate the length of the chassis and preferably adjacent to the transverse chassis members 15 as best seen in FIG. 3.

Each undercarriage unit 20 includes a short axle member 22 pivoted at 24 at its inner end to a suitable bracket or connector 26 carried by the transverse member and spaced inwardly from the adjacent longitudinal chassis member 12. At its outer end each axle member 22 journals a wheel carrier, such as a disk to which a wheel 18 is secured. Adjacent its outer end each axle member 22 carries a bracket or projection 30, preferably extending in a forward direction, to which is pivoted the rear end of a radius rod 32. The forward end of radius rod 32 has a pivotal connection with the front portion of the chassis 10. Thus, in the construction shown, the forward end of each radius rod mounts an upwardly projecting bolt 34 whose upper end mounts a ball 36. The chassis preferably mounts a bracket 38 depending from the front thereof, as from the front transverse member 14 of the chassis adjacent a longitudinal member 12. Bracket 38 preferably carries a socket member 40 in which the ball member 36 fits to provide a universal swinging or pivotal connection of the radius rod 32 with the vehicle chassis. Each of the pivots at 24, 30 and 36 is loose enough to accommodate swinging of axle 20 and rod 32 without binding thereof.

Adjacent the outer end of each axle 20, and preferably adjacent to the pivotal connection at 30 between the axle 20 and the radius rod 32, is mounted a compressible load sustaining unit 42. Each unit 42 preferably comprises a rigid bottom cup-shaped member 44, an inverted top cup-shaped member 46 and a block 48 of compressible resilient material. Bottom cup-shaped member 44 is preferably formed of metal and is welded or otherwise fixedly secured to the axle member 20, and top cup-shaped member 46 is also preferably formed of metal and is welded or otherwise fixedly secured to the bottom part of the vehicle chassis, as at the outer end of the intermediate transverse chassis member 15. The block 48 of compressible resilient material is preferably of cylindrical shape and is bonded or otherwise anchored at its lower end to bottom cup-shaped member 44 and at its upper end to top cup-shaped member 46.

The compressible resilient material of which the block 48 is formed is preferably an energy absorbing type of foam synthetic resin material, such as "Ensolite," "Kolylon" or "Insol," or may be formed of latex foam rubber. The resilient material is suitably loaded or compounded to damp or control its rebound ratio, that is, its rate of recovery from compressed condition, to the extent desired. The compounding will be so controlled as to permit the blocks to be compressed when the wheels encounter bumps, and to expand or rebound slowly from compressed state in a manner to snub the rebound and to provide a stabilizing action, without requiring the use of a separate shock absorber or stabilizer as is commonly required in automotive vehicles utilizing spring type wheel suspension means.

The resilient material will preferably be dipped or otherwise coated with a vinyl resin type of coating, such as "Ensolcoat," or any other type of coating material which will render the resilient block 48 substantially or completely impervious to acids and petroleum products. Alternatively, the side walls of the block 48 may be wrapped with a coated adhesive tape which is impervious to acids and petroleum products, as protective means.

The vehicle wheel suspension means herein described is simple and inexpensive and can be pre-assembled and installed upon a vehicle chassis or frame as a unit with minimum expenditure of time and labor. Each wheel of the vehicle is suspended independently of the other, and its position is controlled at all times by the interaction of the axle 20, radius rod 32 and resilient compressible block 48. The construction has been found well suited for its intended use as applied to trailers and like vehicles carrying relatively light loads, as in the case of a boat trailer. Also it will be observed that regardless of the direction in which stress is applied to a wheel during use, the parts are so arranged as to accept and sustain the stress without changing the position of the wheel in a detrimental manner, so that the construction provides for a long useful life and is subtsantially trouble-free.

While the preferred embodiment of the invention has been illustrated and described it will be understood that changes in the construction may be made within the scope of the appended claims without departing from the spirit of the invention.

I claim:

1. A trailer vehicle adapted to carry a boat or other load, comprising:
   a rigid frame having longitudinal and transverse frame members,
   a pair of wheels disposed at opposite sides of the frame,
   a pair of axles each pivoted at its inner end to the central portion of a transverse member and projecting laterally outwardly to journal a wheel, said axle pivots accommodating vertical swinging of the axles,
   a pair of radius rods each connected to the outer end portion of an axle and extending forwardly therefrom and pivotally connected to said frame, and
   a pair of resilient compressible members each supported on and connected to the outer end of an axle and supporting and connected to said frame, said compressible members being characterized by slow rebound following compression,
   said resilient members constituting bodies of foam material loaded to damp the rate of rebound thereof after compression.

2. A trailer vehicle as defined in claim 1, wherein said resilient material is bonded to rigid members at its top and bottom, which rigid members are secured to said frame and axle respectively.

3. A trailer vehicle as defined in claim 1, wherein each radius rod is connected to said frame by a ball and socket joint.

4. A trailer vehicle as defined in claim 1, wherein said resilient member is formed of foam material covered with a vinyl protective coating.

5. A trailer vehicle as defined in claim 1, wherein said axles are pivoted to a transverse frame member positioned intermediate the length of said frame.

6. An undercarriage for supporting the rigid frame of a trailer vehicle comprising:
   an axle adapted to be pivoted to said frame spaced inwardly from one side thereof and extending laterally outwardly from said pivot,
   a wheel journaled on the outer end of said axle,
   means swinging freely from a part of said frame spaced forwardly of said axle and pivoted to said axle adjacent to said wheel, and
   a resilient compressible connection means extending between and connected to vertically aligned portions of said frame and said axle, said means including a block of foam material anchored relative to said frame at its upper surface and anchored relative to said axle at its bottom surface.

References Cited
UNITED STATES PATENTS

| 2,219,401 | 10/1940 | Sampsell | 280—414 X |
| 3,323,786 | 6/1967 | Boschi | 267—63 |

PHILIP GOODMAN, Primary Examiner

U.S. Cl. X.R.

267—63; 280—106.5